(12) United States Patent
Ikuhara et al.

(10) Patent No.: US 7,357,981 B2
(45) Date of Patent: Apr. 15, 2008

(54) OPTICAL FILTER

(75) Inventors: Isao Ikuhara, Kanagawa (JP); Tsukasa Yamada, Kanagawa (JP); Takumi Ando, Kanagawa (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 10/994,648

(22) Filed: Nov. 23, 2004

(65) Prior Publication Data

US 2005/0094275 A1 May 5, 2005

Related U.S. Application Data

(62) Division of application No. 09/979,027, filed as application No. PCT/JP00/03909 on Jun. 15, 2000, now Pat. No. 6,849,327.

(30) Foreign Application Priority Data

| Jun. 17, 1999 | (JP) | ................................. | 11-171323 |
| Jun. 22, 1999 | (JP) | ................................. | 11-175582 |
| Jun. 29, 1999 | (JP) | ................................. | 11-184003 |

(51) Int. Cl.
*B32B 00/00* (2006.01)
*B32B 17/10* (2006.01)

(52) U.S. Cl. ................ 428/333; 428/336; 428/339; 359/885

(58) Field of Classification Search ............ 359/885, 359/887; 252/582, 586; 428/333, 336, 339
See application file for complete search history.

(56) References Cited

U.S. PATENT DOCUMENTS

| 4,309,484 | A | * | 1/1982 | Ohmae et al. | ............ | 428/441 |
| 4,668,729 | A | * | 5/1987 | Kataoka | ............ | 524/449 |
| 4,913,846 | A | | 4/1990 | Suzuki et al. | | |
| 5,079,132 | A | * | 1/1992 | Mitsui et al. | ............ | 430/359 |
| 5,804,102 | A | * | 9/1998 | Oi et al. | ............ | 252/587 |
| 5,945,209 | A | | 8/1999 | Okazaki et al. | | |
| 6,104,530 | A | * | 8/2000 | Okamura et al. | ............ | 359/359 |
| 6,157,504 | A | * | 12/2000 | Yamada et al. | ............ | 359/885 |
| 6,307,671 | B1 | | 10/2001 | Yabuki | | |
| 6,309,564 | B1 | | 10/2001 | Harada et al. | | |
| 6,319,594 | B1 | | 11/2001 | Suzuki et al. | | |
| 6,515,811 | B2 | * | 2/2003 | Ikuhara et al. | ............ | 359/885 |
| 6,532,120 | B1 | | 3/2003 | Harada et al. | | |

(Continued)

FOREIGN PATENT DOCUMENTS

EP 0977060 A2 2/2000

(Continued)

OTHER PUBLICATIONS

Patent Abstracts of Japan, vol. 1996, No. 03, Mar. 29, 1996, JP 07 311301 A.

(Continued)

*Primary Examiner*—Thao Tran
(74) *Attorney, Agent, or Firm*—Buchanan Ingersoll & Rooney PC

(57) ABSTRACT

An optical filter comprising a transparent support having a tensile impact strength of 392 kJ/m² or more having provided thereon a filter layer having an absorption maximum in the range of from 560 to 620 nm.

3 Claims, 2 Drawing Sheets

U.S. PATENT DOCUMENTS

| | | | |
|---|---|---|---|
| 6,849,327 B1* | 2/2005 | Ikuhara et al. | 428/339 |
| 2002/0005509 A1* | 1/2002 | Teng et al. | 252/582 |

FOREIGN PATENT DOCUMENTS

| | | |
|---|---|---|
| EP | 1124144 A1 | 8/2001 |
| JP | 07-311301 A | 11/1995 |
| JP | 2000-43175 A | 2/2000 |
| JP | 2000-105541 A | 4/2000 |
| JP | 2000-137111 A | 5/2000 |
| WO | WO 00/23829 A1 | 4/2000 |

OTHER PUBLICATIONS

Patent Abstracts of Japan, vol. 1998, No. 12, Oct. 31, 1998, JP 10 180947 A.

* cited by examiner

OPTICAL FILTER

CROSS-REFERENCE TO RELATED APPLICATIONS

This application is a divisional of application Ser. No. 09/979,027, filed Nov. 15, 2001, the contents of which are incorporated herein by reference, now U.S. Pat. No. 6,849,327, which is the national stage entry of the International Application PCT/JP00/03909, filed Jun. 15, 2000, which claims foreign priority to JP 11-171323 filed Jun. 17, 1999, JP 11-175582 filed Jun. 22, 1999, and JP 11-184003 filed Jun. 29, 1999.

TECHNICAL FIELD

The present invention relates to an optical filter comprising a filter layer absorbing visible light, a transparent support, in particular a transparent support comprising a biaxially stretched film, and an antireflection layer. In particular, the present invention relates to an optical filter attached to the display of image displays, e.g., a liquid crystal display (LCD), a plasma display panel (PDP), an electroluminescence display (ELD), a cathode ray tube (CRT), a fluorescent character display tube and an electric field emission display for the purpose of preventing reflection and improving color reproduction. The present invention further relates to the front panel of a plasma display panel (PDP) and the body of PDP equipped with an optical filter for preventing reflection and improving color reproduction.

BACKGROUND ART

Various kinds of image displays, e.g., a liquid crystal display (LCD), a plasma display panel (PDP), an electroluminescence display (ELD), a cathode ray tube (CRT), a fluorescent character display tube and an electric field emission display, have been developed and apparatuses incorporated these image displays have been put to practical use in recent years.

These image displays are confronted with various problems, e.g., a problem that color correction is necessary since color purity and color separation of display elements are insufficient, a problem that contrast is reduced since backgrounds are reflected on displays, and a problem of leaking out of infrared rays and electromagnetic waves attributable to display elements. For coping with each problem, it is proposed to use a visible filter for color correction, an antireflection film, an infrared ray-shielding filter, and an electromagnetic wave-shielding filter, etc., on the front of displays.

In particular, color correction by a filter is described in Japanese Patent Laid-Open Nos. 153904/1983, 188501/1986, 231988/1991, 205643/1993, 145918/1997, 306366/1997 and 26704/1998 and WO98/23980.

Various kinds of producing methods of optical filters are disclosed. In the optical filters disclosed in Japanese Patent Laid-Open Nos. 188501/1986, 205643/1993, 145918/1997 and 306366/1997, dyes or pigments are added to transparent supports to make the supports function as filters. In the optical filter disclosed in Japanese Patent Laid-Open No. 26704/1998, the hard coat layer (the surface-hardening layer) provided between the transparent support and the antireflection layer is colored to make the hard coat layer function as a filter. In the optical filter disclosed in Japanese Patent Laid-Open No. 209510/1995, a mixed solution of a dye and a metal alkoxide are coated, dried and burned to make it function as the filter layer. Further, in the optical filter disclosed in WO98/23980, a dye and a matrix polymer is dissolved in an appropriate solvent and coated to make it function as the filter layer.

However, the filter layers produced by these methods come to reflect light of specified wavelength when the concentration of the dyes in the filter layers becomes high, which deteriorates color correcting performance of the optical filter. Contrary to this, when the dye concentration in a filter layer is lowered, the thickness of the filter layer should be increased to obtain the optical concentration as the optical filter. Accordingly, in the production process of filter layers by coating, troubles such as drying failure and cracking of films are liable to occur.

Further, multilayer antireflection films produced by laminating transparent thin films of metal oxides, which are used for spectacle lenses, camera lenses, etc., are used for preventing reflection, and the more the layer number, the more effective is the multilayer antireflection film to the lights of a wide wavelength range. Therefore, multilayer lamination of transparent thin films by a vacuum deposition method, a sputtering method, an ion-plating method, a CVD method, or a PVD method has been performed.

However, since a high degree of vacuum is necessary in these methods, equipment becomes large-scaled, further it is required to exactly control the thickness of each layer according to the relationship between the refractive indices and the film thicknesses previously designed, therefore, there is a problem in the productivity and it is difficult to produce an antireflection film on a large size film inexpensively.

Further, since films are deformed and denatured by heat, they cannot be exposed to a high temperature, in addition the volatile components (water, solvents, etc.) of films hinder maintaining a high degree of vacuum, so there arises a problem that the film thickness and strength are liable to become uneven when transparent thin films each having a different refractive index are laminated on a film by a vacuum deposition method or a sputtering method.

For solving such problems due to a vacuum deposition or sputtering method, a method of forming an antireflection film by wet coating has been discussed. For example, an antireflection transparent material containing microvoids and an inorganic fine particles of a diameter of from 1 to 300 nm and having an antireflection layer having a refractive index lower than that of the substrate is disclosed in Japanese Patent Laid-Open No. 59250/1985. However, even with to this technique, the obtained sample must be subjected to treatment with an activated gas under vacuum to lower the refractive index, which encounters the same problem as the deposition (high vacuum system and delicate control of activated gas treatment).

Further, in Japanese Patent Laid-Open Nos. 49501/1984, 50401/1984 and 48527/1995, antireflection films having a low refractive index layer using silica particles and a silane hydrolyzed product as the binder are disclosed. However, in this constitution, it is difficult to suppress the refractive index of the low refractive index layer sufficiently low, thus such a problem as a low refractive index cannot be obtained still remains.

A variety of subjects are required of these filters respectively by the kinds of displays, e.g., a visible filter for color correction is required to form a sharp absorber corresponding to the characteristics of the display elements, in addition, strengthening of a heat resisting property by glass incorporation, etc., and physical strengthening are required. Further, it is necessary for an antireflection film to have multilayer structure for achieving ideal refractive indices in every range of visible light, however, forming a multilayer film by deposition or coating is accompanied by processing difficulties and an economical problem. Accordingly, when various functions are tried to be given to the front panel of a display, there arises the restriction that one function must not hinder other functions in addition to the fact that filters having the respective functions are required to have respective characteristics. Therefore, a multifunctional front panel has not been put to practical use as yet.

Further, the front panel having an antireflection layer and a selectively absorptive filter layer is required to have strength of more than a certain degree since not only the front panel must prevent the scattering of display elements at the back of the front panel at the time of breakage but also it has to be sufficiently resistive to the breakage of its own.

Accordingly, an object of the present invention is to provide a multifunctional optical filter which satisfies the requirements such as excellence in production aptitude, non-bulk, light weight and high mechanical strength, and a front panel and an image display using the same, in particular, to provide an optical filter having a proper color correcting performance in addition to the antireflection performance, and a front panel and an image display using the same.

Another object of the present invention is to provide an optical filter capable of selectively cutting the light of the wavelengths which reduce color purity to correct color balance, and to provide an image display using the same.

A further object of the present invention is to provide an optical filter which can suppress the reduction of visibility due to the reflection of external light on a display panel, can regulate colors and is improved in resistance to breakage.

DISCLOSURE OF THE INVENTION

The above objects of the present invention have been accomplished by the following invention.

(1) An optical filter comprising a transparent support having provided at least on one side of the support a filter layer containing a dye and a polymer binder, wherein an antireflection layer having an antireflection property to visible light is provided on the side opposite to the side on which the filter layer is provided when the filter layer is provided on either one side, and the antireflection layer is provided on either one side when the filter layers are provided on both sides, and the transparent support comprises a biaxially stretched film having a thickness of from 10 to 500 μm.

(2) The optical filter as described in the above item (1), wherein the material of the biaxially stretched film is a polyester, a polycarbonate or a polyacrylate.

(3) The optical filter as described in the above item (1) or (2), wherein at least one side of the transparent support comprising a biaxially stretched film is provided with an undercoat layer comprising a polymer having a glass transition temperature of from −20° C. to 60° C.

(4) The optical filter as described in the above item (3), wherein the undercoat layer provided on the transparent support comprising the biaxially stretched film comprises a first undercoat layer contiguous to the transparent support comprising a styrene-butadiene-based copolymer and a second undercoat layer comprising an acrylic-based resin.

(5) An optical filter comprising a transparent support having a tensile impact strength of 392 kJ/m² or more having provided thereon a filter layer having an absorption maximum in the range of from 560 to 620 nm.

(6) The optical filter as described in any of the above items (1) to (5), wherein the filter layer comprises a dye and a polymer binder in a weight ratio of from 1:50 to 1:2,000.

(7) An optical filter comprising a transparent support having provided thereon a filter layer comprising a dye and a polymer binder, wherein the filter layer has an absorption maximum in the range of from 560 to 620 nm, and the weight ratio of the dye and the polymer binder is from 1:50 to 1:2,000.

(8) The optical filter as described in any of the above items (5) to (7), wherein at least one side of the transparent support is provided with an undercoat layer comprising a polymer having a glass transition temperature of from −20° C. to 60° C.

(9) The optical filter as described in the above item (7), wherein the undercoat layer provided on the transparent support comprises a first undercoat layer contiguous to the transparent support comprising a styrene-butadiene-based copolymer and a second undercoat layer comprising an acrylic-based resin.

(10) The optical filter as described in any of the above items (5) to (8), wherein the transparent support has a thickness of from 5 μm to 5 cm.

(11) The optical filter as described in any of the above items (5) to (8), wherein the transparent support comprises a biaxially stretched film having a thickness of from 10 to 500 μm.

(12) The optical filter as described in the above item (11), wherein the material of the biaxially stretched film is a polyester, a polycarbonate or a polyacrylate.

(13) The optical filter as described in any of the above items (1) to (12), wherein the filter layer has absorption maximums in both of from 560 to 620 nm and from 500 to 550 nm.

(14) The optical filter as described in any of the above items (1) to (13), wherein the filter layer has an absorption maximum of transmittance of from 0.01 to 80% in the range of from 560 to 620 nm.

(15) The optical filter as described in the above item (14), wherein the filter layer has an absorption maximum of transmittance of from 20 to 85% in the range of from 500 to 550 nm.

(16) The optical filter as described in any of the above items (1) to (13), wherein the filter layer has an absorption maximum of transmittance of from 40 to 85% in the range of from 500 to 550 nm and an absorption maximum of transmittance of from 0.01 to 40% in the range of from 560 to 620 nm.

(17) The optical filter as described in any of the above items (1) to (16), wherein the half value width of the absorption maximum of the filter layer in the range of from 560 to 620 nm is 50 nm or less.

(18) The optical filter as described in any of the above items (1) to (16), wherein the half value width of the absorption maximum of the filter layer in the range of from 560 to 620 nm is from 10 to 50 nm.

(19) The optical filter as described in any of the above items (1) to (18), wherein the filter layer comprises at least an oxonol dye or a cyanine dye.

(20) The optical filter as described in any of the above items (1) to (19), wherein the polymer binder contained in the filter layer is gelatin.

(21) The optical filter as described in any of the above items (1) to (20), wherein the transparent support has an antireflection layer comprising a low refractive index layer having a refractive index at least lower than that of the support.

(22) The optical filter as described in any of the above items (1) to (20), wherein the transparent support has an antireflection layer having a refractive index of. 1.45 or less.

(23) The optical filter for PDP as described in any of the above items (1) to (22), which is used for a plasma display.

(24) A front panel of a plasma display panel using the optical filter as described in any of the above items (1) to (22).

(25) A plasma display panel using the optical filter as described in any of the above items (1) to (24).

(26) A plasma display panel using the front panel as described in the above item (24).

BRIEF DESCRIPTION OF THE DRAWINGS

FIG. 1(a) is a conceptual drawing of the case where body A is in contact with front panel D, and FIG. 1(b) is a conceptual drawing of the case where there is a space between body A and front panel D.

A CRT or PDP
B Biaxially stretched transparent support
C Optical filter (various kinds of filter layers and antireflection layers)
D Front panel
E The face of the observation side of a front panel
F The face of the CRT or PDP side of a front panel
G The face of the observation side of CRT or PDP

FIG. 2(a) and FIG. 2(b) are the examples of the layer constitutions corresponding to the arrangement of FIG. 1(a), and FIG. 2(c) and FIG. 2(d) are those to the arrangement of FIG. 1(b).

Figure 1:
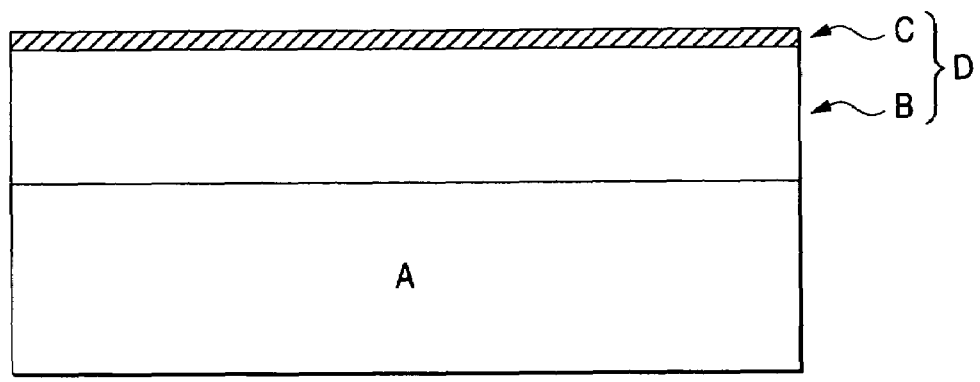
FIG. 1 is a cross-sectional conceptual drawing in the case of using the front panel of the present invention at the front of body A of a cathode ray tube (CRT) or a plasma display panel (PDP).
Figure 1:
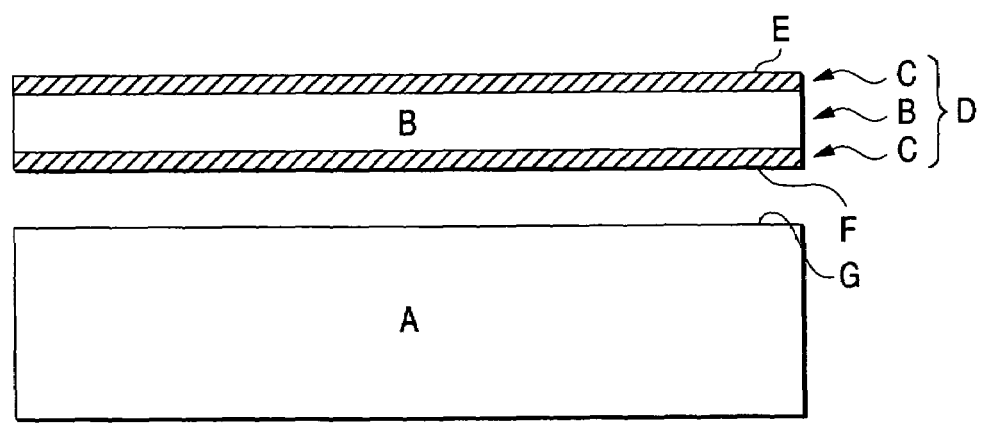

1 Antireflection layer
2 Eelectromagnetic wave- and infrared ray-shielding layer
3 Hard coat layer
4 Biaxially stretched transparent support
5 Filter layer
6 Transparent glass support

BEST MODE FOR CARRYING OUT THE INVENTION

The present invention can be explained with referring to some examples shown below, but the present invention is not limited thereto unless otherwise indicated.

A plasma display panel (PDP) in the present invention comprises a gas; a glass substrate, an electrode, an electrode lead material, a thick print material and a fluorescent material. The glass substrate consists of a front glass substrate and a rear glass substrate. Electrodes and insulating layers are formed on the two glass substrates. A fluorescent material layer is further formed on the rear glass substrate. The two glass substrates are assembled and a gas is sealed therebetween.

The front panel is a substrate which is positioned in front of the plasma display panel. It is preferred that the front panel possesses sufficient strength for protecting the plasma display panel. The front panel may be used with leaving space between the front panel and the plasma display panel or may be directly adhered to the plasma display body.

The plasma display in the present invention means the entire display comprising at least the plasma display panel body and the box. When the plasma display has a front panel, it is also included in the plasma display.

The plasma display panel (PDP) has come into the market. The plasma display panel is disclosed in Japanese Patent Laid-Open Nos. 205643/1993 and 306366/1997.

The representative layer constitutions of the optical filter for the image display and the front panel using the same in the present invention are explained with referring to the accompanying drawings.

The layer constitutions of the optical filter used as the front panels of or the parts of the cathode ray tube (CRT) and the plasma display panel (PDP) are described below.

FIG. 1 is a cross-sectional conceptual drawing in the case of using front panel D of the present invention at the front of body A of a cathode ray tube (CRT) or a plasma display panel (PDP). FIG. 1(a) is a conceptual drawing of the case where body A is in contact with front panel D, and optical filter C comprising various kinds of filter layers and antireflection layers is provided only on one side (the front) of the support of the front panel. FIG. 1(b) is a conceptual drawing of the case where there is a space between body A and front panel D, and optical filter C comprising various kinds of filter layers and antireflection layers are provided on both sides of the support of the front panel.

Figure 2:
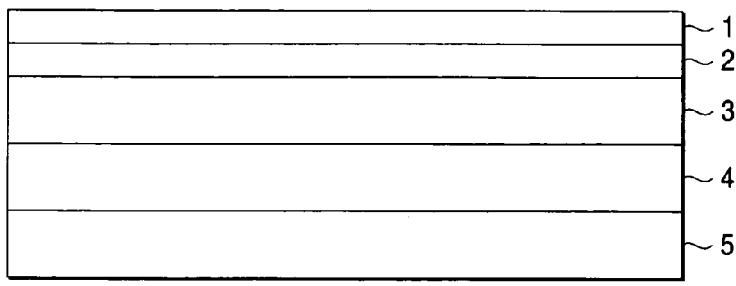
FIG. 2 is a cross-sectional typical drawing of the layer constitution of a front panel.
Figure 2:
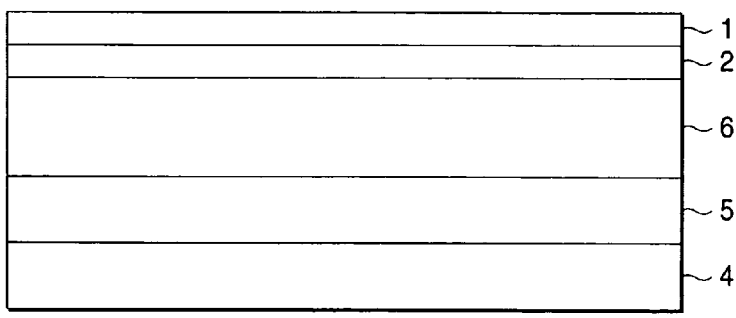
Figure 2:
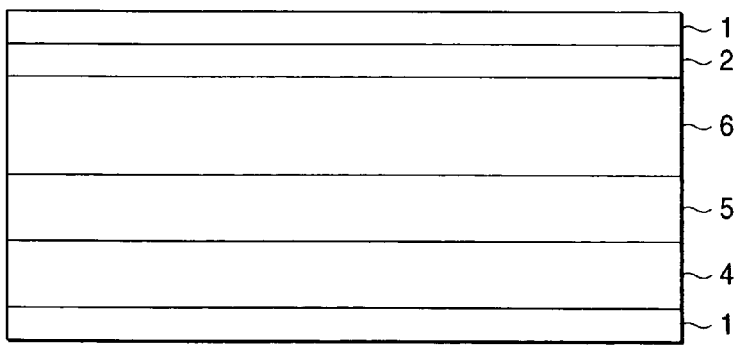
Figure 2:
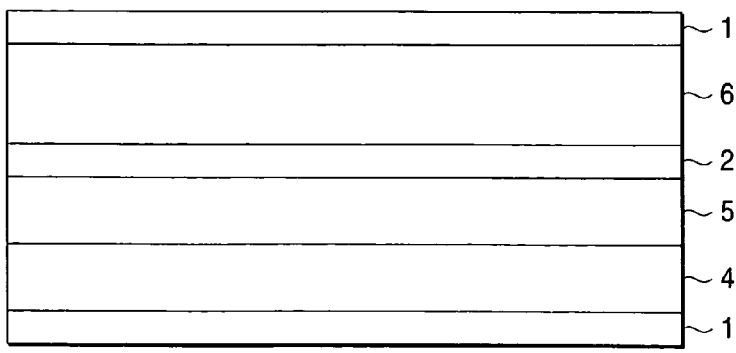

FIG. 2 is a cross-sectional typical drawing of the layer constitution of the optical filter and a front panel using the same. FIG. 2(a) and FIG. 2(b) are the examples of the layer constitutions of the optical filters corresponding to the arrangement of FIG. 1(a) and the front panels using the same, and FIG. 2(c) and FIG. 2(d) are the examples of the layer constitutions of the optical filters corresponding to the arrangement of FIG. 1(b) and the front panels using the same.

In FIG. 2(a), it is preferred that undercoat layers are provided between the biaxially stretched transparent support and the hard coat layer and between the biaxially stretched transparent support and the filter layer for obtaining sufficient adhesion strength.

In FIG. 2(b), it is preferred that an undercoat layer is provided between the biaxially stretched transparent support and the filter layer for obtaining sufficient adhesion strength. The filter layer and the transparent glass support can be easily adhered by means of, e.g., commercially available acrylic-based adhesives.

In FIG. 2(c) and FIG. 2(d), it is preferred that undercoat layers are provided between the biaxially stretched transparent support and the filter layer and between the biaxially stretched transparent support and the antireflection layer for obtaining sufficient adhesion strength.

(Transparent Support)

The transparent support for use in the present invention is described in detail below. The examples of the transparent supports which can be used in the present invention include cellulose ester (e.g., diacetyl cellulose, triacetyl cellulose (TAC), propionyl cellulose, butyryl cellulose, acetyl propionyl cellulose, nitrocellulose), polyamide, polycarbonate, polyester (e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate), polyallylate (e.g., condensation products of bisphenol A and phthalic acid), polystyrene (e.g., syndiotactic polystyrene), polyolefin (e.g., polyethylene, polypropylene, polymethylpentene), acryl(polymethyl methacrylate), polysulfone, polyether sulfone, polyether ketone, polyether imide and polyoxyethylene. Triacetyl cellulose, polycarbonate, polymethyl methacrylate, polyethylene terephthalate and polyethylene naphthalate are preferred.

The transparent support preferably has a thickness of from 5 μm to 5 cm, more preferably from 25 μm to 1 cm, and most preferably from 80 μm to 1.2 mm.

It is preferred to use a biaxially stretched film as the transparent support.

Examples of the materials of the biaxially stretched films include polyester (e.g., polyethylene terephthalate, polyethylene naphthalate, polybutylene terephthalate, poly-1,4-cyclohexanedimethylene terephthalate, polyethylene-1,2-diphenoxyethane-4,4'-dicarboxylate, polybutylene terephthalate), polyamide, polycarbonate, polyallylate (e.g., condensation products of bisphenol A and phthalic acid), polystyrene (e.g., syndiotactic polystyrene), polyphenylene sulfide, polyether ether ketone, polyolefin (e.g., polyethylene, polypropylene, polymethylpentene), polysulfone, polyether sulfone, and polyoxyethylene. Polyester, polycarbonate and polyallylate (e.g., condensation products of bisphenol A and phthalic acid) are preferred, and from the viewpoint of mechanical strength, durability, wide usage and heat resistance, polyester, in particular, polyesters containing ethylene terephthalate and ethylene-2,6-naphthalate as main repeating units are preferred. In the present invention, polyethylene terephthalate is a polymer containing an ethylene terephthalate unit as a main repeating unit. Further, in the present invention, polyethylene naphthalate is a polymer containing an ethylene-2,6-naphthalate unit as a main repeating unit. "Containing as a main repeating unit" used herein means that it is a polymer containing the repeating unit in an amount of 70 mol % or more, preferably 85 mol % or more, and more preferably 95 mol % or more, and copolymerizable other components, glycol components other than ethylene glycol, dicarboxylic acid components other than terephthalic acid or 2,6-naphthalenedicarboxylic acid, or a small amount of trifunctional components may be contained.

The biaxially stretched transparent support is a film obtained by melt-extruding resin compositions comprising any of the above resin as a main component, biaxially stretching and thermally fixing.

The biaxially stretched transparent support has a thickness of from 10 to 500 μm, preferably from 20 to 300 μm, and more preferably from 50 to 200 μm.

The biaxially stretched transparent support according to the present invention is large in the transmittance of rays of the support itself and excellent in mechanical strength and heat resistance due to the synergistic effect of the above biaxial stretching and the specific thickness of the support, therefore, it becomes possible to laminate layers having various functions.

The transparent support preferably has a transmittance of 80% or more, more preferably 86% or more. Since when the tensile impact strength of the transparent support is weak, if the transparent support to be used is not thick, the impact strength of a certain degree or more cannot be obtained, the objective transmittance may not be obtained. Therefore, it is necessary that the tensile impact strength be 294 kJ/m² even at the lowest, and 392 kJ/m² or more in practice. A tensile impact strength can be obtained according to ASTM D1822-93.

The haze is preferably 5% or less, more preferably 4% or less.

The refractive index is preferably from 1.45 to 1.70.

An infrared absorber or an ultraviolet absorber may be added to the transparent support. The addition amount of an infrared absorber is preferably from 0.01 to 20 wt %, more preferably from 0.05 to 10 wt %, of the transparent support. Further, the particles of inactive inorganic compounds may be added as a sliding agent to the transparent support. The examples of inorganic compounds include $SiO_2$, $TiO_2$, $BaSO_4$, $CaCO_3$, talc and kaolin. It is preferred that the transparent support is subjected to surface treatment so as to further heighten the adhesion to the undercoat layer. As such surface treatments, chemical treatment, mechanical treatment, corona discharge treatment, flame treatment, ultraviolet irradiation treatment, high frequency treatment, glow discharge treatment, active plasma treatment, laser treatment, mixed acid treatment and ozone oxidation treatment can be exemplified, glow discharge treatment, ultraviolet irradiation treatment, corona discharge treatment, and flame treatment are preferred, and corona discharge treatment is more preferred.

(Filter layer)

It is preferred that the filter layer has an absorption maximum in the range of wavelength of from 500 to 620 nm, more preferably absorption maximums in both of from 500 to 550 nm and from 560 to 620 nm.

The transmittance of the range of wavelength of from 500 to 550 nm is preferably from 20 to 85%, more preferably from 40 to 85%.

The absorption maximum in the range of wavelength of from 500 to 550 nm is set to adjust the emission strength of a green fluorescent material of high visibility. It is preferred that the emission range of a green fluorescent material is cut gently. The half value width (the width of the region of the wavelength showing the absorbance of half of the absorbance at absorption maximum) of the absorption maximum in the range of wavelength of from 500 to 550 nm is preferably from 30 to 300 nm, more preferably from 40 to 300 nm, still more preferably from 50 to 150 nm, and most preferably from 60 to 150 nm.

The transmittance at absorption maximum in the range of wavelength of from 560 to 620 nm is preferably from 0.01 to 80%, preferably from 0.01 to 60%, and particularly preferably from 0.01 to 40%.

The absorption maximum in the range of wavelength of from 560 to 620 nm is set to selectively cut the sub-band which lowers the color purity of a red fluorescent material. In PDP, unnecessary luminescence in the vicinity of 585 nm emitted by the excitation of neon is cut and at the same time lights of short wave side from red fluorescent material is cut. By separating absorption maximum according to the present invention, light can be cut selectively without adversely affecting the color tone of a green fluorescent material. For further reducing the influence on the color tone of a green fluorescent material, the peak of absorption spectrum is preferably sharp. Specifically, the half value width of the absorption maximum in the range of wavelength of from 560 to 620 nm is preferably from 5 to 200 nm, more preferably from 10 to 100 nm, and most preferably from 10 to 50 nm.

For giving the above absorption spectrum, a filter layer is formed by using a coloring material (a dye or a pigment).

The weight ratio of the dye and the binder in the filter layer in the present invention is desirably from 1:50 to 1:2,000, preferably from 1:75 to 1:1,000, and more preferably from 1:100 to 1:500. If the dye/binder ratio is larger than this range, the dye concentration in the filter layer is high, hence the filter layer comes to reflect the light of specific wavelength, which deteriorates the color correction function of the optical filter. While when the ratio is smaller than this range, the dye concentration in the filter layer is low, hence the layer thickness of the filter layer must be thick for obtaining desired optical density. The production of a thick filter layer is often accompanied by troubles such as streaks by coating, drying failure and cracking of a film in coating and drying, or even if the layers are divided and thin layers are laminated, the producing process is complicated, accordingly the manufacture is not easy.

As the dyes having an absorption maximum in the range of wavelength of from 500 to 550 nm, a squarylium-based, azomethine-based, cyanine-based, oxonol-based, anthraquinone-based, azo-based or benzylidene-based compound is preferably used. Many azo dyes disclosed in British Patents 539,703 and 575,691, U.S. Pat. No. 2,956,879 and Hiroshi Horiguchi, Sosetsu Gosei Senryo (An Introduction to synthetic Dyes), Sankyo Shuppan Co., Ltd., etc., can be used as the azo dyes. An azo dye represented by formula (a6) is preferred. Some examples of the dyes having an absorption maximum in the range of wavelength of from 500 to 550 nm are shown below.

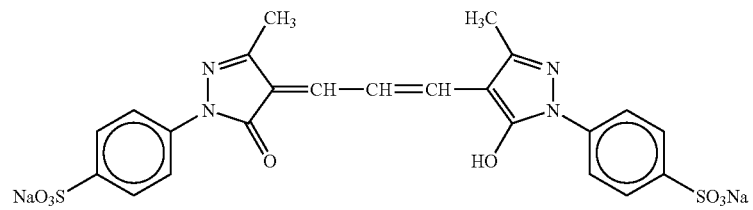

(a1)

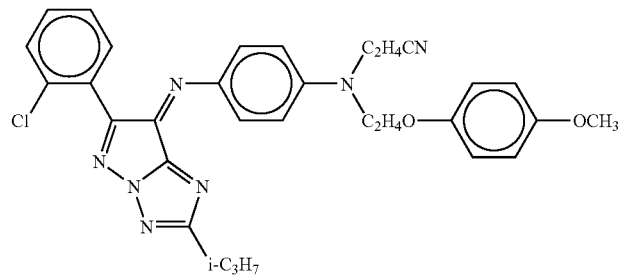

(a2)

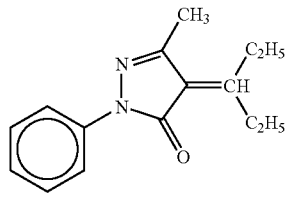

(a3)

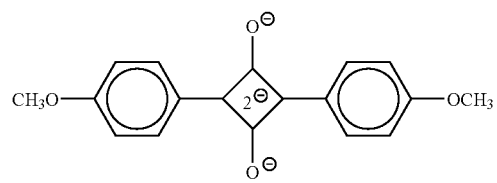

(a4)

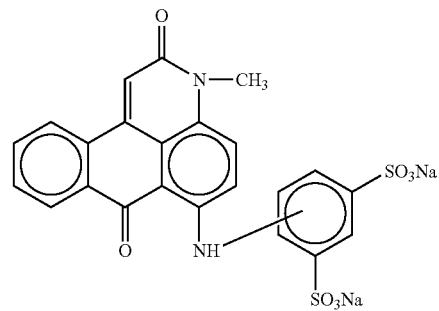

(a5)

(a6)

-continued

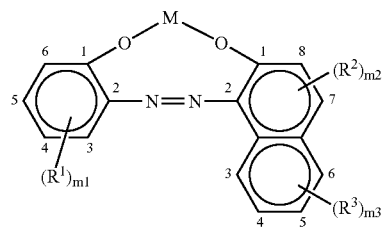

| Compound | M | $(R^1)_{m1}$ | $(R^2)_{m2}$ | $(R^3)_{m3}$ |
|---|---|---|---|---|
| (a6-1) | Cu | 4-SO$_3$Na | 8-SO$_3$Na | 5-SO$_3$Na |
| (a6-2) | Cu | 4-Cl, 6-SO$_3$Na | 8-SO$_3$Na | 5-SO$_3$Na |
| (a6-3) | Cu | 4, 6, di-NO$_2$ | 8-SO$_3$Na | 5-SO$_3$Na | wherein $R^1$, $R^2$ and $R^3$ each independently represents a hydrogen atom or a monovalent group; M represents a metal atom; and $m^1$, $m^2$ and $m^3$ each independently represents an integer of from 1 to 4. As the metal atoms represented by M, transition metals are preferred, e.g., Fe, Co, Ni, Cu, Zn and Cd can be exemplified, and Cu is particularly preferred.

(a7)

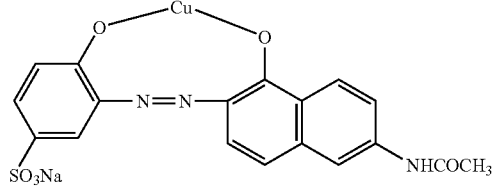

(a8)

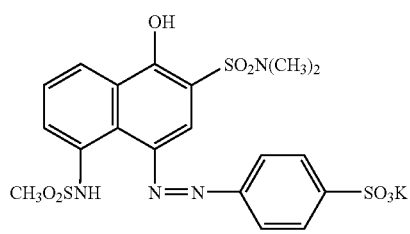

(a9)

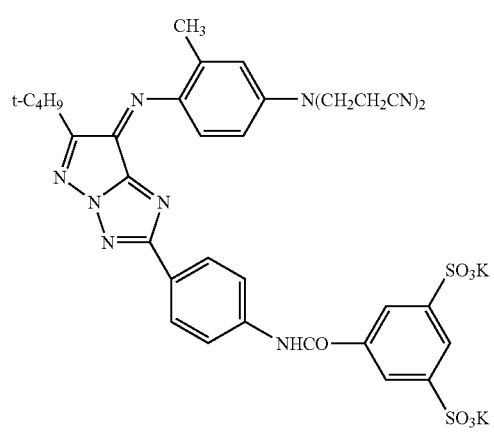

(a10)

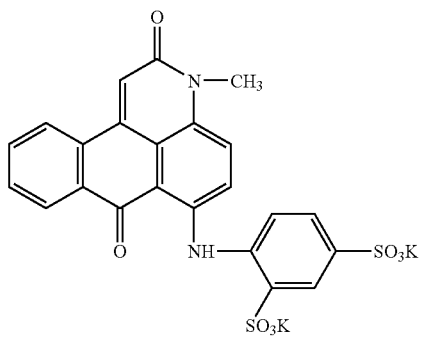

(a11)

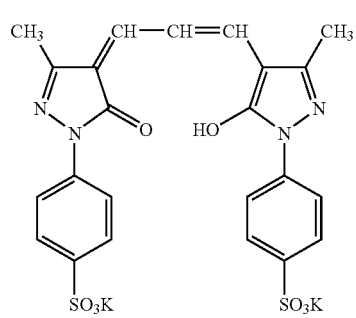

(a12)

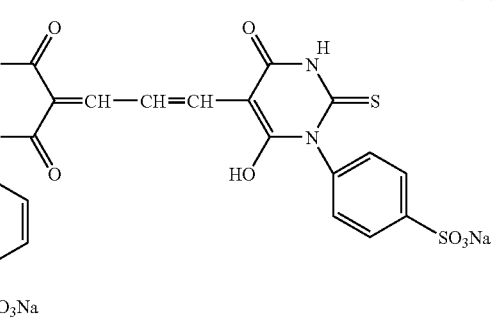

(a13)

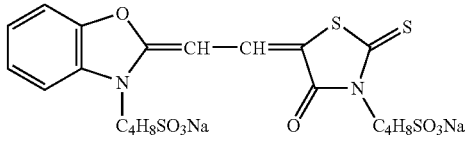

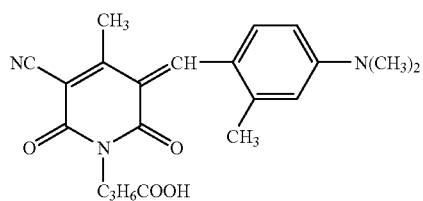 (a14)
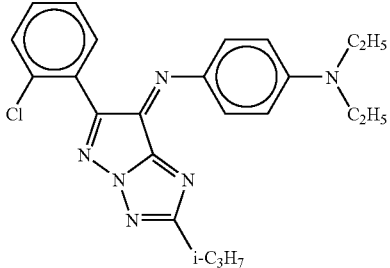 (b2)
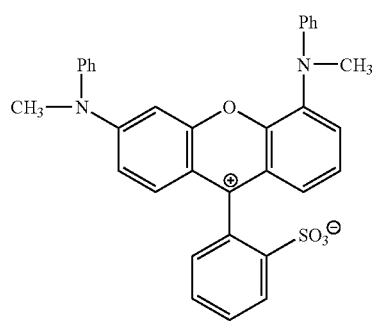 (a15)
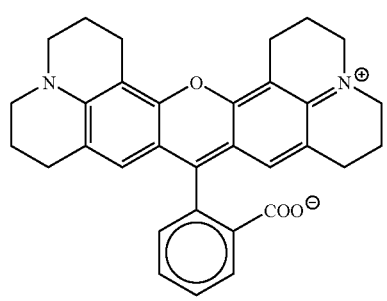 (b3)
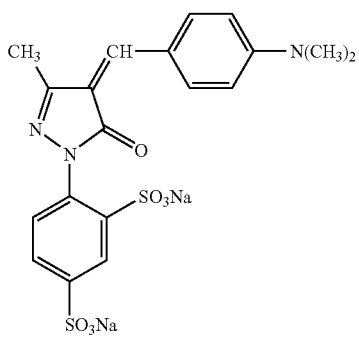 (a16)
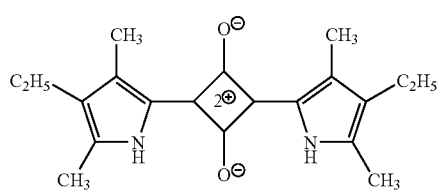 (b4)
As the dyes having an absorption maximum in the range of wavelength of from 560 to 620 nm, a cyanine-based, squarylium-based, azomethine-based, xanthene-based, oxonol-based or azo-based compound is preferably used. Examples of the dyes having an absorption maximum in the wavelength range of from 560 to 620 nm are shown below.
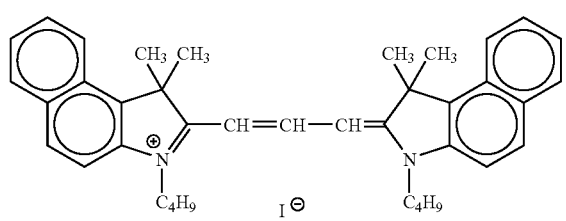 (b5)
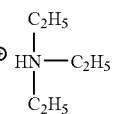
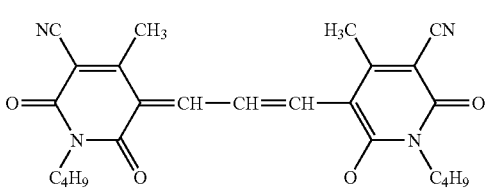 (b6)
(b1)
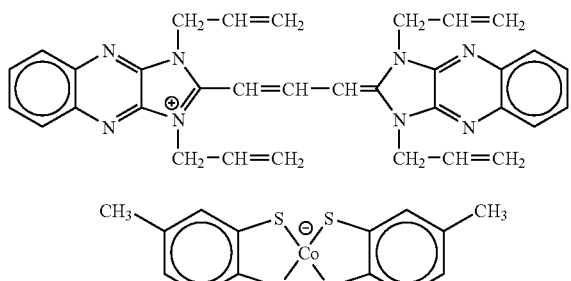
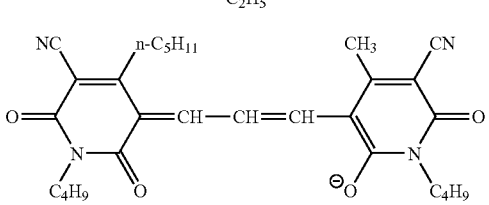 (b7)

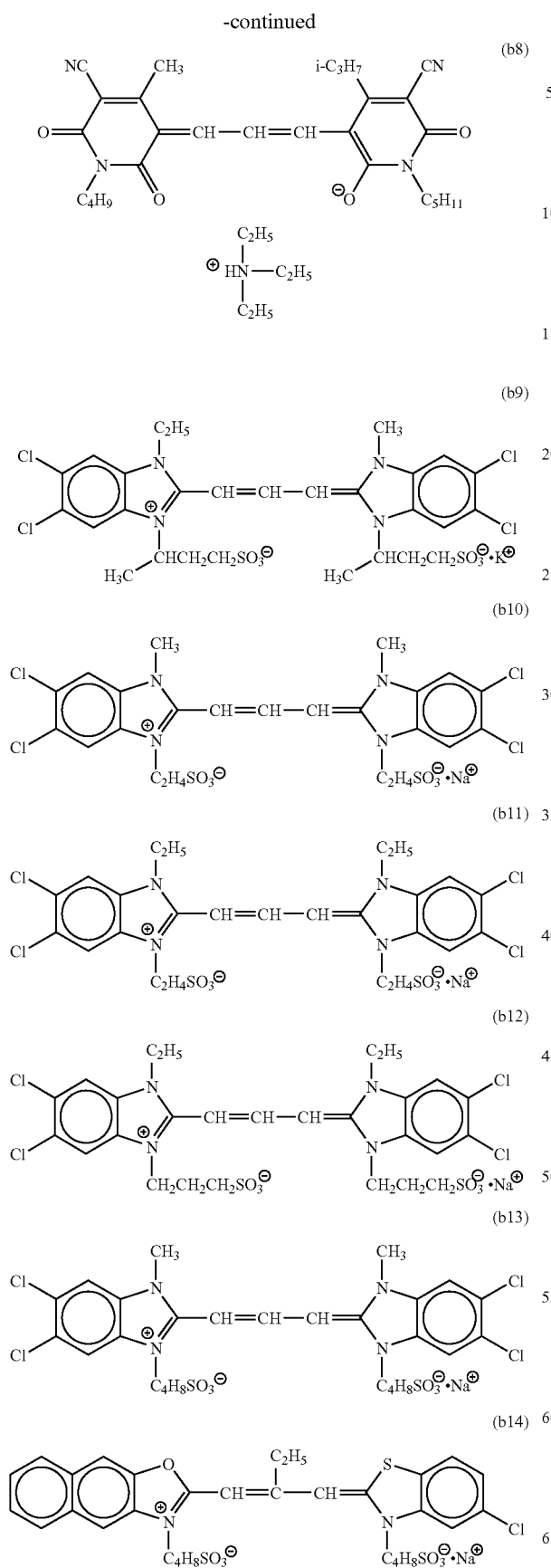

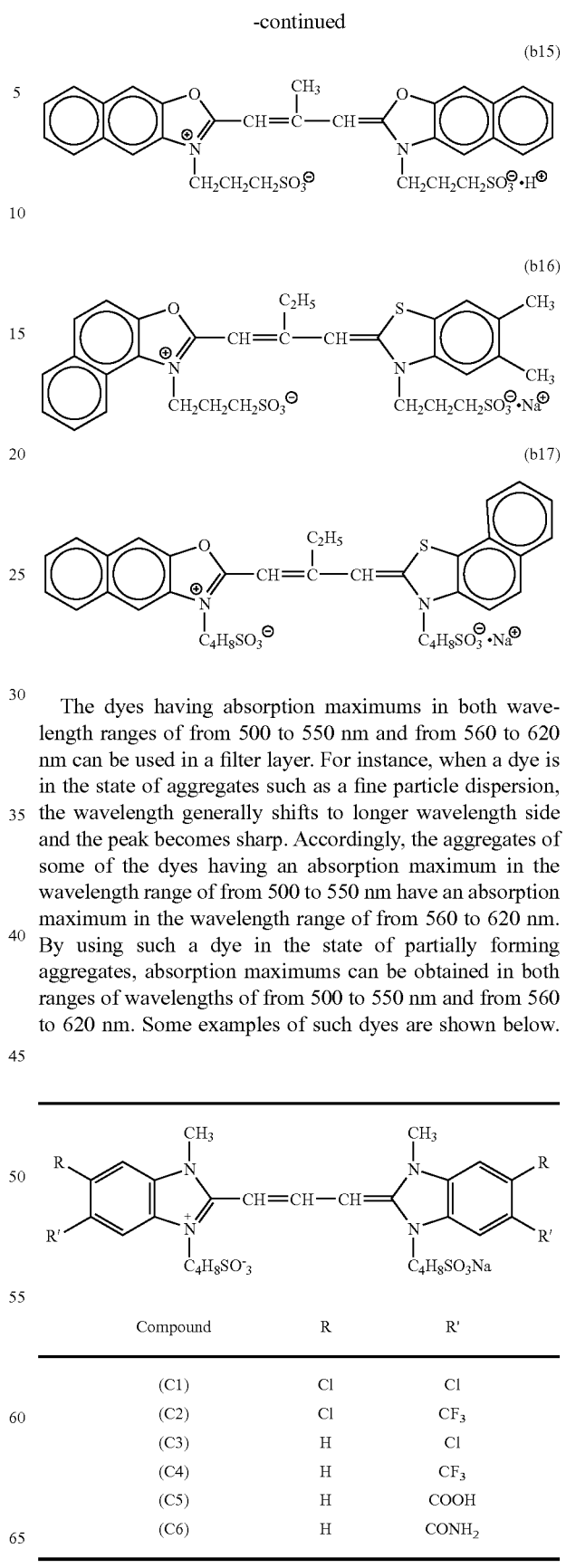

The dyes having absorption maximums in both wavelength ranges of from 500 to 550 nm and from 560 to 620 nm can be used in a filter layer. For instance, when a dye is in the state of aggregates such as a fine particle dispersion, the wavelength generally shifts to longer wavelength side and the peak becomes sharp. Accordingly, the aggregates of some of the dyes having an absorption maximum in the wavelength range of from 500 to 550 nm have an absorption maximum in the wavelength range of from 560 to 620 nm. By using such a dye in the state of partially forming aggregates, absorption maximums can be obtained in both ranges of wavelengths of from 500 to 550 nm and from 560 to 620 nm. Some examples of such dyes are shown below.

| Compound | R | R' |
|---|---|---|
| (C1) | Cl | Cl |
| (C2) | Cl | $CF_3$ |
| (C3) | H | Cl |
| (C4) | H | $CF_3$ |
| (C5) | H | COOH |
| (C6) | H | $CONH_2$ |

-continued

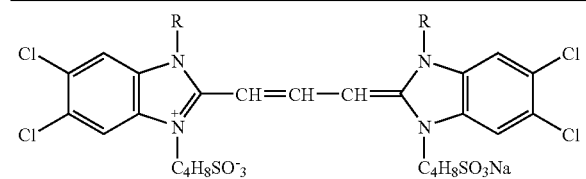

| Compound | R |
|---|---|
| (C7) | $C_2H_5$ |
| (C8) | $n\text{-}C_3H_7$ |
| (C9) | $t\text{-}C_3H_7$ |
| (C10) | $C_2H_4OCH_3$ |
| (C11) | $C_2H_4OH$ |

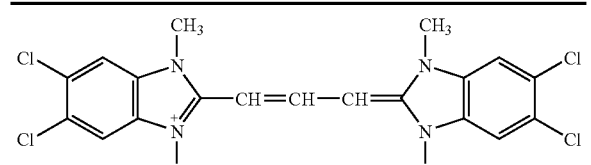

| Compound | R | R' | |
|---|---|---|---|
| (C12) | $C_2H_4SO^-_3$ | $C_2H_4SO_3K$ | |
| (C13) | $C_3H_6SO^-_3$ | $C_3H_6SO_3Na$ | |
| (C14) | $CH_3CH_2CH-SO^-_3$ $\quad$ $\underset{CH_3}{\|}$ | $CH_3CH_2CH-SO^-_3$ $\quad$ $\underset{CH_3}{\|}$ | $(C_2H_5)_3{}^+NH$ |
| (C15) | $C_2H_4COO^-$ | $C_2H_4COOK$ | |
| (C16) | $C_4H_8SO^-_3$ | $C_4H_8COOK$ | |

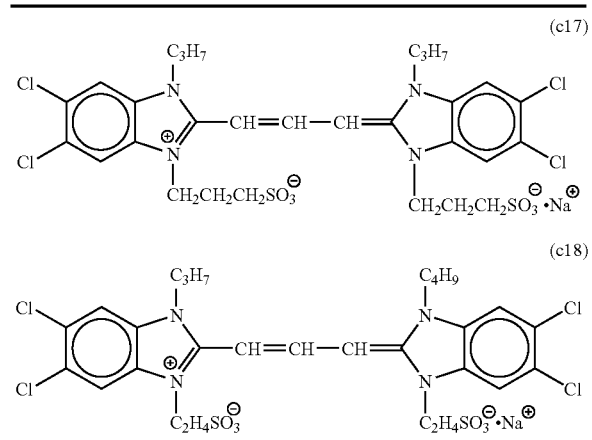

Two kinds or more dyes can be used in combination in a filter layer as described above.

A filter layer further comprises a polymer binder. Natural polymers (e.g., gelatin, cellulose derivatives, alginic acid) or synthetic polymers (e.g., polymethyl methacrylate, polyvinyl butyral, polyvinyl pyrrolidone, polyvinyl alcohol, polyvinyl chloride, styrene-butadiene copolymer, polystyrene, polycarbonate, water-soluble polyamide) can be used as the binder polymer. Hydrophilic polymers (e.g., the above-described natural polymers, polyvinyl butyral, polyvinyl pyrrolidone, polyvinyl alcohol and water-soluble polyamide) are particularly preferably used.

The thickness of a filter layer is preferably from 0.1 μm to 5 cm, more preferably from 0.5 μm to 1 cm, and most preferably from 1 μm to 7 mm.

(Undercoat Layer)

When the above-described filter layer, infrared ray-shielding layer and electromagnetic wave-shielding layer are provided on a support, an undercoat layer can be provided on the support. As the undercoat layer, soft polymers having a modulus of elasticity at room temperature of from 1 to 1,000 MPa, preferably from 5 to 800 MPa, more preferably from 10 to 500 MPa, are preferably used. The thickness of the undercoat layer is preferably from 2 nm to 20 μm, more preferably from 5 mn to 5 μm, and most preferably from 50 nm to 1 μm.

The polymers for use in the undercoat layer preferably has a glass transition temperature of from −60° C. to 60° C. As the examples of the polymers having a glass transition temperature of from −60° C. to 60° C., polymers or copolymers of vinyl chloride, vinylidene chloride, vinyl acetate, butadiene, neoprene, styrene, chloroprene, acrylic ester, methacrylic ester, acrylonitrile, or methyl vinyl ether can be exemplified. A plurality of undercoat layers can be provided, and it is preferred to provide two undercoat layers.

(Antireflection Layer)

The regular reflectance of an antireflection layer is 3.0% or less, preferably 1.8% or less. A low refractive index layer is usually provided as the antireflection layer. The refractive index of the low refractive index layer is lower than the refractive index of the above-described transparent support. The refractive index of the low refractive index layer is preferably from 1.20 to 1.55, more preferably from 1.30 to 1.50. The thickness of the low refractive index layer is preferably from 50 to 400 nm, more preferably from 50 to 200 nm.

The low refractive index layer can be formed as a layer comprising a low refractive index fluorine-containing polymer (Japanese Patent Laid-Open Nos. 34526/1982, 130103/1991, 115023/1994, 313702/1996 and 168004/1995), a layer obtained by a sol-gel method (Japanese Patent Laid-Open Nos. 208811/1993, 299091/1994, 168003/1995), or a layer containing fine particles (Japanese Patent Publication No. 59250/1985, and Japanese Patent Laid-Open Nos. 13021/1993, 56478/1994, 92306/1995 and 288201/1997). In the layer containing fine particles, voids can be formed in the low refractive index layer as micro voids among fine particles or in fine particles. The layer containing fine particles preferably has voids of from 3 to 50 vol %, more preferably from 5 to 35 vol %.

It is preferred that a layer high in refractive index (a middle or high refractive index layer) is laminated on the low refractive index layer for preventing the reflection of a broad wavelength region.

The refractive index of the high refractive index layer is preferably from 1.65 to 2.40, more preferably from 1.70 to 2.20. The refractive index of the middle refractive index layer is adjusted so as to be the middle value between the refractive index of the low refractive index layer and the refractive index of the high refractive index layer. The refractive index of the middle refractive index layer is preferably from 1.50 to 1.90.

The thickness of the middle/high refractive index layers is preferably from 5 nm to 100 μm, more preferably from 10 nm to 10 μm, and most preferably from 30 nm to 1 μm.

The haze of the middle/high refractive index layers is preferably 5% or less, more preferably 3% or less, and most preferably 1% or less.

The middle/high refractive index layers can be formed by using a polymer having a relatively high refractive index. The examples of the polymers having high refractive index include polystyrene, styrene copolymers, polycarbonate, melamine resins, phenolic resins, epoxy resins and the polyurethanes obtained by the reaction of cyclic (alicyclic or aromatic) isocyanate and polyol. Other polymers having a cyclic (aromatic, heterocyclic, alicyclic) group and polymers having a halogen atoms other than a fluorine atom as the substituent are also high in a refractive index. Polymers may be formed by a polymerization reaction of a monomer having made radical curing possible by introducing a double bond.

Inorganic fine particles may be dispersed in a polymer binder for obtaining a further high refractive index. The refractive index of the inorganic fine particles is preferably from 1.80 to 2.80. The inorganic fine particles are preferably formed of a metal oxide or a metal sulfide. The examples of the metal oxides or sulfides include titanium dioxide (e.g., structures such as rutile, mixed crystals of rutile/anatase, anatase, amorphous), tin oxide, indium oxide, zinc oxide, zirconium oxide and zinc sulfide. Titanium oxide, tin oxide and indium oxide are particularly preferred. The inorganic fine particles can further contain other elements with the above metal oxide or metal sulfide as the main component. The main component is the component having the largest content (wt %) of the components constituting the particles. The examples of other elements include Ti, Zr, Sn, Sb, Cu, Fe, Mn, Pb, Cd, As, Cr, Hg, Zn, Al, Mg, Si, P and S.

The middle/high refractive index layers can also be formed with inorganic materials which can form a film and are dispersible in a solvent or inorganic materials which are liquids in themselves, for instance, alkoxides of various kinds of elements, salts of organic acids, coordination compounds which are bonded to coordination compounds (e.g., a chelate compound), or active inorganic polymers.

(Eelectromagnetic Wave- and Infrared Ray-shielding Layer)

The surface resistivity of the layer having an electromagnetic wave-shielding effect in the present invention is from 0.01 to 500 Ω/□, more preferably from 0.01 to 10 Ω/□. For providing an electromagnetic wave-shielding effect, it is preferred to use a transparent electrically conductive layer so as not to lower the transmittance of the front panel.

As the transparent electrically conductive layer, a metal layer, a metal oxide layer, and an electrically conductive polymer layer can be exemplified.

As the metals for forming the transparent electrically conductive layer, silver, palladium, gold, platinum, rhodium, aluminum, iron, cobalt, nickel, copper, zinc, ruthenium, tin, tungsten, iridium, lead and the alloys of these metals can be exemplified, and silver, palladium, gold, platinum, rhodium alone, and the alloys of these metals are preferred. The alloy of palladium and silver is preferred and the content of silver is preferably from 60 to 99%, more preferably from 80 to 95%. The thickness of the metal layer is preferably from 1 to 100 nm, more preferably from 5 to 40 nm, and most preferably from 10 to 30 nm. If the layer thickness is less than 1 nm, an electromagnetic wave-shielding effect is insufficient, while if it exceeds 100 nm, the transmittance of visible light is reduced.

As the metal oxides for forming the transparent electrically conductive layer, tin oxide, indium oxide, antimony oxide, zinc oxide, ITO and ATO can be exemplified. The thickness of the metal oxide layer is preferably from 20 to 1,000 nm, more preferably from 40 to 100 nm. It is preferred to use these transparent electrically conductive metal layer and transparent electrically conductive metal oxide layer in combination. It is also preferred to use metals and electrically conductive metal oxides in the same layer.

For the purpose of protecting a metal layer, preventing oxidation deterioration from occurring, and increasing the transmittance of visible light, a transparent oxide layer may be laminated. This transparent oxide layer may be or may not be electrically conductive. As the transparent oxide layers, the thin films of the oxides of divalent to tetravalent metals, zirconium oxide, titanium oxide, magnesium oxide, silicon oxide, aluminum oxide, and metal alkoxide compounds can be exemplified.

The methods of forming the transparent electrically conductive layer and the transparent oxide layer are not particularly restricted and any arbitrary processing method can be used. For example, any well-known techniques, such as a sputtering method, a vacuum deposition method, an ion plating method, a plasma CVD or PVD method, and coating of ultrafine particles of the corresponding metals or metal oxides can be used.

The infrared ray-shielding effect in the present invention means the function of shielding the line spectrum in the near infrared region of from 800 to 1,200 nm. The shielding characteristic of the line spectrum in the near infrared region is required that the transmittance is 15% or less at 800 nm and 5% or less at 850 nm. For giving the infrared ray-shielding effect, a method of mixing a near infrared ray-absorbing compound to a transparent plastic support can be used. For instance, the infrared ray-shielding effect can be obtained easily by forming a resin composition containing a copper atom (Japanese Patent Laid-Open No. 118228/1994), a resin composition containing a copper compound and a phosphorus compound (Japanese Patent Laid-Open No. 5190/1987), a resin composition containing a copper compound and a thiourea derivative (Japanese Patent Laid-Open No. 73197/1994), a resin composition containing a tungsten-based compound (U.S. Pat. No. 3,647,729), etc. A method of forming a transparent silver layer is inexpensive and preferred to give an infrared ray-shielding effect in addition to an electromagnetic wave-shielding effect.

(Other Layers)

A hard coat layer, a lubricating layer, an antifouling layer, an antistatic layer or an intermediate layer may be provided in the present invention.

It is preferred for the hard coat layer to contain a crosslinked polymer. The hard coat layer can be formed by using acryl-based, urethane-based, epoxy-based, siloxane-based polymers, oligomers or monomers (e.g., ultraviolet-curable resins). Silica-based fillers can be added to the hard coat layer.

A lubricating layer may be provided on the outermost surface of the antireflection layer. The lubricating layer has functions of providing a sliding property to the surface of the antireflection layer and improving scratch resistance. The lubricating layer can be formed by using polyorganosiloxane (e.g., silicon oil), natural wax, petroleum wax, higher fatty acid metal salt, fluorine-based lubricant or the derivative of them. The thickness of the lubricating layer is preferably from 2 to 20 nm.

An antifouling layer may also be provided on the outermost surface of the antireflection layer. The antifouling layer is provided for reducing the surface energy of the antireflection layer, to thereby make it hard to be stained with hydrophilic or hydrophobic stain. The antifouling layer can also be formed with a fluorine-containing polymer. The thickness of the antifouling layer is from 2 to 100 nm, preferably from 5 to 30 nm.

In the present invention, an antiglare function can be provided on the surface (a function of scattering the incident rays at the surface to thereby prevent circumferential scenery of the layer from being reflected on the surface of the layer). An antiglare function can be obtained, for example, by forming fine unevenness on the surface of a transparent film and an antireflection layer is formed on the surface of the transparent film, or an antireflection layer is formed in the first place and unevenness is formed on the surface by means of an embossing roll.

An antireflection layer having an antiglare function generally has a haze of from 3 to 30%.

An antireflection layer (a low refractive index layer), a filter layer, an infrared ray- and electromagnetic wave-shielding layer, an undercoat layer, a hard coat layer, a lubricating layer, an antifouling layer, an antistatic layer and other layers can be formed by ordinary coating methods. The examples of the coating methods include a dip coating method, an air knife coating method, a curtain coating method, a roller coating method, a wire bar coating method, a gravure coating method and an extrusion coating method using a hopper (disclosed in U.S. Pat. No. 2,681,294). Two or more layers may be coated at the same time. Simultaneous coating methods are disclosed, e.g., in U.S. Pat. Nos. 2,761,791, 2,941,898, 3,508,947 and 3,526,528 and Yuji Harazaki, Coating Kogaku (Coating Engineering), p. 253, Asakura Shoten Co. (1973).

The present invention is specifically described below with referring to examples, but it should not be construed as the present invention is limited thereto.

EXAMPLES 1 TO 3

(Formation of Undercoat Layer)

Both sides of biaxially stretched polyethylene terephthalate transparent films having three kinds of different thicknesses of 250 μm, 100 μm and 50 μm were subjected to corona discharge treatment, and then a styrene-butadiene copolymer latex (LX407C5, manufactured by Zeon Corporation) having a refractive index of 1.55 and a glass transition temperature of 37° C. was coated on both sides of the films, thereby undercoat layers were formed. Coating was performed so as to obtain a dry thickness of 300 nm of the side of the film on which a filter layer was to be provided, and 150 nm of the side on which a low refractive index layer was to be provided.

(Formation of Second Undercoat Layer)

A gelatin aqueous solution containing an acetic acid and a glutaraldehyde was coated on the undercoat layer on the side of the film on which a filter layer was to be provided in a dry thickness of 100 nm, and an acrylic-based latex (HA16, manufactured by Nippon Acryl Co., Ltd.) having a refractive index of 1.50 and a glass transition temperature of 50° C. was coated on the undercoat layer on the side of the film on which a low refractive index layer was to be provided in a dry thickness of 20 nm, thereby the second undercoat layers were formed.

(Formation of Low Refractive Index Layer as Antireflection Layer)

To 2.50 g of a reactive fluorine-containing polymer (JN-7219, manufactured by JSR Corporation) was added 1.3 g of t-butanol and stirred at room temperature for 10 minutes, and the mixed solution was filtered through a polypropylene filter having a pore diameter of 1 μm. The thus-obtained coating solution for a low refractive index layer was coated on one side of the transparent support (the side on which 150 nm of the styrene-butadiene copolymer latex and 20 nm of acryl latex were coated as the undercoat layers) in a dried film thickness of 96 nm by means of a bar coater and dried at 120° C. for 15 minutes to cure the coated layer, thereby a low refractive index layer was formed.

(Formation of Filter Layer)

Zero point zero five (0.05) grams of dye (c1) and 0.15 g of dye (a6-1) were dissolved in 180 g of a 10 wt % aqueous solution of gelatin, stirred at 40° C. for 30 minutes and filtered through a polypropylene filter having a pore diameter of 2 μm. The thus-obtained coating solution for a filter layer was coated in a dried film thickness of 3.5 μm on the second undercoat layer on the side opposite to the side of the transparent support on which the low refractive index layer was coated, and dried at 120° C. for 10 minutes, thereby a filter layer was formed, thus a support having provided thereon an antireflection layer and a filter layer was formed.

The spectral transmittance of each of the above-obtained three kinds of supports was measured. Each of them had an absorption maximum at 535 nm and 595 nm, and the transmittance at absorption maximum at 535 nm was 69% and that at 595 nm was 23%. The half value width of the absorption maximum at 535 nm was 63 nm and that at 595 nm was 30 nm.

(Coating of Electromagnetic Wave- and Infrared Ray-shielding Layer and Antireflection Layer on a Transparent Glass Support)

Silver was sputtered on the surface of a colorless transparent glass plate having a thickness of 3 mm and a film having a surface resistivity of 2.5 Ω/cm$^2$ and a thickness of about 12 nm was prepared.

$MgF_2$, $SiO_2$, $TiO_2$ and $MgF_2$ were deposited in this order on the thus-coated silver film by means of a vacuum deposition method so that the optical film thickness (the product of the refractive index and the film thickness) fell within the range of from 130 to 140 nm. The reflectance of this antireflection layer was measured and the surface reflectance was 0.6%.

(Production of Front Panel)

An acrylic-based adhesive was coated in a thickness of 30 μm on the surface of the filter layer of the polyethylene terephthalate film having provided thereon the low refractive index layer and the filter layer by means of coating, and this was stuck on the side opposite to the side on which the antireflection layer was deposited of the glass plate deposited with the antireflection layer, thus the front panel of the present invention was prepared.

EXAMPLES 4 TO 6

(Formation of Undercoat Layer)

Both sides of polyethylene terephthalate transparent films having three kinds of different thicknesses of 250 μm, 100 μm and 50 μm were subjected to corona discharge treatment, and then a latex (LX407C5, manufactured by Zeon Corporation) made from a styrene-butadiene copolymer having a refractive index of 1.55 and a glass transition temperature of 37° C. was coated on the side on which a filter layer was to be provided in a thickness of 300 nm, and a latex made from a vinylidene chloride-acrylic acid-methyl acrylate copolymer having a refractive index of 1.58 and a glass transition temperature of −10° C. was coated in a thickness of 145 nm on the opposite side thereof, that is, on the side on which a low refractive index layer was to be provided.

(Formation of Second Undercoat Layer)

Second undercoat layers were formed in the same manner as in Examples 1 to 3.

(Formation of Low Refractive Index Layer as Antireflection Layer)

A low refractive index layer was formed in the same manner as in Examples 1 to 3.

(Formation of Filter Layer)

A filter layer was formed in the same manner as in Examples 1 to 3 except that 0.15 g of dye (a5) was used in place of dye (a6-1), thus a support having provided thereon an antireflection layer and a filter layer was formed.

The spectral transmittance of each of the above-obtained three kinds of supports was measured. Each of them had an absorption maximum at 534 nm and 594 nm, and the transmittance at absorption maximum at 534 nm was 65% and that at 594 nm was 21%. The half value width of the absorption maximum at 534 nm was 78 nm and that at 594 nm was 28 nm.

(Production of Front Panel)

The polyethylene terephthalate film having provided thereon an antireflection layer and a filter layer by means of coating in the same manner as in Examples 1 to 3 was stuck on the glass transparent support having provided thereon an electromagnetic wave- and infrared ray-shielding layer and an antireflection layer by means of coating in the same manner as in Examples 1 to 3, thus a front panel was prepared.

EXAMPLES 7 TO 9

(Formation of Undercoat Layer)

Undercoat layers were formed in the same manner as in Examples 1 to 3.

(Formation of Second Undercoat Layer)

Second undercoat layers were formed in the same manner as in Examples 1 to 3.

(Formation of Low Refractive Index Layer)

A low refractive index layer was formed in the same manner as in Examples 1 to 3.

(Formation of Filter Layer)

A filter layer was formed in the same manner as in Examples 1 to 3 except that 0.05 g of dye (a1) was used in place of dye (a6-1), thus a support having provided thereon an antireflection layer and a filter layer was formed.

The spectral transmittance of each of the above-obtained three kinds of supports was measured. Each of them had an absorption maximum at 533 nm and 594 nm, and the transmittance at absorption maximum at 533 nm was 63% and that at 594 nm was 22%. The half value width of the absorption maximum at 533 nm was 63 nm and that at 594 nm was 29 nm.

(Production of Front Panel)

The polyethylene terephthalate film having provided thereon an antireflection layer and a filter layer by means of coating in the same manner as in Examples 1 to 3 was stuck on the glass transparent support having provided thereon an electromagnetic wave- and infrared ray-shielding layer and an antireflection layer by means of coating in the same manner as in Examples 1 to 3, thus the front panel according to the present invention was prepared.

(Evaluation of Filter Function)

The front panel of the plasma display panel (PDS4202J-H, manufactured by Fujitsu Limited) was removed and each of the front panels prepared in Examples 1 to 9 was mounted on the body so that the filter layer faced the image display surface of the plasma display panel. The electromagnetic wave- and infrared ray-shielding layer was connected to the ground metal plate on the back of the plasma display panel, and the function was evaluated by conducting the voltage induced on the electromagnetic wave- and infrared ray-shielding layer by the electromagnetic wave emitted from the plasma display panel to the ground plate. The items which were evaluated were an electromagnetic wave- and infrared ray-shielding performance, the measurement of a contrast of the displayed image and the evaluation of a color reproduction property by visual observation.

The electromagnetic wave-shielding performance was at least 9 dB or more in the range of the frequency of from 10 to 200 MHz with every sample in Examples 1 to 9, thus the leakage level of electromagnetic waves restricted in information processors and the like was achieved. Further, the line spectrum-shielding performance in the near infrared region was about 8% at 800 nm and 3% or less at 850 nm, thus the hindrance to the infrared ray remote-controlled apparatus installed peripherally could be prevented.

A contrast and a color reproduction property by visual observation were conspicuously improved in all of Examples 1 to 9. The contrast before replacing the front panels was 10:1 but it was improved to 15:1 in all of the examples. It was confirmed, as compared with the contrast before replacing the front panels, that orangish red was improved to pure red, greenish blue to clear blue and yellowish white was improved to pure white.

EXAMPLE 10

(Formation of Undercoat Layer)

Both sides of a transparent polyethylene terephthalate film (having a tensile impact strength of 784 kJ/m$^2$) having a thickness of 100 μm were subjected to corona discharge treatment, and then a latex (LX407C5, manufactured by Zeon Corporation) made from a styrene-butadiene copolymer having a refractive index of 1.55 and a glass transition temperature of 37° C. was coated on both sides of the film, thereby undercoat layer was formed. Coating was performed so as to obtain a dry thickness of 300 nm of the side of the film on which a filter layer was to be provided, and 150 nm of the side on which a low refractive index layer was to be provided.

(Formation of Second Undercoat Layer)

Second undercoat layers were formed in the same manner as in Examples 1 to 3.

(Formation of Low Refractive Index Layer)

A low refractive index layer was formed in the same manner as in Examples 1 to 3.

(Formation of Filter Layer)

A filter layer was formed in the same manner as in Examples 1 to 3 except that 0.05 g of dye (b13) and 0.15 g of dye (a11) were used, thus selective absorption filter A was formed.

The spectral transmittance of the above filter A was measured. Filter A had absorption maximum at 535 nm and 595 nm, and the transmittance at absorption maximum at 535 nm was 69% and that at 595 nm was 23%. The half value width of the absorption maximum at 535 nm was 63 nm and that at 595 nm was 30 nm. The surface reflectance was 1.2%.

EXAMPLE 11

Selective absorption filter B was prepared according to the same procedure as in Example 10 except for using a transparent triacetyl cellulose film (having a tensile impact strength of 490 kJ/m$^2$) having a thickness of 50 μm as the transparent support.

The spectral transmittance of the above filter B was measured. Filter B had absorption maximum at 535 nm and 595 nm, and the transmittance at absorption maximum at 535 nm was 71% and that at 595 nm was 22%. The half value width of the absorption maximum at 535 nm was 64 nm and that at 595 nm was 29 nm. The surface reflectance was 1.4%.

EXAMPLE 12

Selective absorption filter C was prepared according to the same procedure as in Example 10 except for using a transparent polycarbonate support (having a tensile impact strength of 804 kJ/m$^2$) having a thickness of 25 μm as the transparent support.

The spectral transmittance of the above filter C was measured. Filter C had absorption maximum at 535 nm and 595 nm, and the transmittance at absorption maximum at 535 nm was 67% and that at 595 nm was 20%. The half value width of the absorption maximum at 535 nm was 65 nm and that at 595 nm was 28 nm. The surface reflectance was 1.3%.

COMPARATIVE EXAMPLE 1

Selective absorption filter D was prepared according to the same procedure as in Example 10 except for using a transparent polystyrene support (having a tensile impact strength of 206 kJ/m$^2$) having a thickness of 50 μm as the transparent support.

The spectral transmittance of the above filter D was measured. Filter D had absorption maximum at 535 nm and 595 nm, and the transmittance at absorption maximum at 535 nm was 71% and that at 595 nm was 21%. The half value width of the absorption maximum at 535 nm was 66 nm and that at 595 nm was 31 nm. The surface reflectance was 1.3%.

COMPARATIVE EXAMPLE 2

Selective absorption filter E was prepared according to the same procedure as in Example 10 except for using a transparent triacetyl cellulose film (having a tensile impact strength of 147 kJ/m$^2$) having a thickness of 10 μm as the transparent support.

The spectral transmittance of the above filter E was measured. Filter E had absorption maximum at 535 nm and 595 nm, and the transmittance at absorption maximum at 535 nm was 71% and that at 595 nm was 25%. The half value width of the absorption maximum at 535 nm was 62 nm and that at 595 nm was 29 nm. The surface reflectance was 1.4%.

(Impact Resistance Test)

A front panel was produced by laminating Filters A to E on a reinforced glass plate (10 cm square) having a thickness of 3 mm with an adhesive. The height of 50% breakage of this front panel was found according to JIS K 7211 "General rule of drop impact test of cured plastics". A steel ball having a diameter of about 50 mm and a mass of 0.5 kg was used in the test. The criterion of breakage was whether the reinforced glass plate was broken and separated to small pieces or not. The results obtained are shown in Table 1 below.

TABLE 1

| Front Panel | Height of 50% Breakage (m) |
|---|---|
| Example 10 | 0.98 |
| Example 11 | 0.90 |
| Example 12 | 1.1 |
| Comparative Example 1 | 0.69 |
| Comparative Example 2 | 0.68 |
| Without a filter | 0.67 |

(Packaging Test)

The front panel of the PDP display (PDS4202J-H: manufactured by Fujitsu Limited) was removed and the back film of the front panel was peeled off, and then Filters A to E described in the above Examples and Comparative Examples were stuck thereon with an adhesive. The contrast of the display of each sample was measured and white and red lights were evaluated. The results obtained are shown in Table 2 below.

TABLE 2

| Front Panel | Contrast | White Light | Red Light |
|---|---|---|---|
| Example 10 | 15:1 | White (improved) | Red (improved) |
| Example 11 | 15:1 | White (improved) | Red (improved) |
| Example 12 | 15:1 | White (improved) | Red (improved) |
| Comparative Example 1 | 15:1 | White (improved) | Red (improved) |
| Comparative Example 2 | 15:1 | White (improved) | Red (improved) |
| Without a filter | 10:1 | Yellowish white | Orange |

As is apparent from the results in Examples and Comparative Examples, by using the transparent film having a tensile impact strength of 392 kJ/m$^2$ or more as the supports of a filter layer and an antireflection layer, a front panel can be provided with impact resistance.

EXAMPLE 13

(Formation of Undercoat Layer)

Both sides of a transparent biaxially stretched polyethylene terephthalate film having a thickness of 175 μm were subjected to corona discharge treatment, and then a latex (LX407C5, manufactured by Zeon Corporation) made from a styrene-butadiene copolymer having a refractive index of 1.55 and a glass transition temperature of 37° C. was coated on both sides of the film, thereby undercoat layers were formed. Coating was performed so as to obtain a dry thickness of 300 nm of one side and 150 nm of the other side.

(Formation of Filter Layer)

A 1N sodium hydroxide solution was added to 180 g of a 10 wt % gelatin aqueous solution so that pH became 7, dye (b13) was added thereto in an arbitrary amount, and the mixed solution was stirred at 30° C. for 24 hours. The thus-obtained coating solution for a filter layer was coated on the side of the transparent support on which the undercoat layer having a thickness of 300 nm was coated in a coating amount of dye (b13) of 15 mg/m², and the coated layer was dried at 120° C. for 10 minutes, thereby a filter layer was obtained. The weight ratio of dye/gelatin of each filter layer of Samples A-1 to A-6 prepared above are shown in Table 3 below.

(Formation of Low Refractive Index Layer as Antireflection Layer)

To 2.50 g of a reactive fluorine-containing polymer (JN-7225, manufactured by JSR Corporation) was added 5.0 g of MIBK and stirred at room temperature for 10 minutes, and the mixed solution was filtered through a polypropylene filter having a pore diameter of 1 μm. The thus-obtained coating solution was coated on the side opposite to the side on which the filter layer was provided of Samples 1 to 6 in a dry coating thickness of 96 nm by means of a bar coater and dried at 120° C. for 15 minutes to cure the coated layer, thereby a low refractive index layer was formed.

EXAMPLE 14

Samples B-1 to B-6 were prepared in the same manner as the preparation of Samples A-1 to A-6 except that dye (b13) was replaced with dye (b16).

(Evaluation of Filter Function)

The outermost surface film of the front panel of the plasma display panel (PDS4202J-H, manufactured by Fujitsu Limited) (E face of the plasma display shown in FIG. 1 above) was peeled off, and the optical filters produced in Example 13 or 14 (the surface of the side on which a low refractive index layer was not provided) were stuck thereon with an adhesive. Cracking of the optical filters and white light and red light of the displayed images were visually evaluated. The results obtained are shown in Table 3 below.

TABLE 3

| Sample No. | Dye/Gelatin (by weight) | Filter Function White Light | Filter Function Red Light | Cracking |
|---|---|---|---|---|
| A-1 (Comparison) | 1:5 | Orangish white | Orangish red | ◯ |
| A-2 (Comparison) | 1:20 | Orangish white | Orangish red | ◯ |
| A-3 (Invention) | 1:50 | White (improved) | Red (improved) | ◯ |
| A-4 (Invention) | 1:500 | White (improved) | Red (improved) | ◯ |
| A-5 (Comparison) | 1:2,000 | White (improved) | Red (improved) | ◯ |
| A-6 (Comparison) | 1:3,000 | White (improved) | Red (improved) | x |
| B-1 (Comparison) | 1:5 | Orangish white | Orangish red | ◯ |
| B-2 (Comparison) | 1:20 | Orangish white | Orangish red | ◯ |
| B-3 (Invention) | 1:50 | White (improved) | Red (improved) | ◯ |
| B-4 (Invention) | 1:500 | White (improved) | Red (improved) | ◯ |
| B-5 (Comparison) | 1:2,000 | White (improved) | Red (improved) | ◯ |
| B-6 (Comparison) | 1:3,000 | White (improved) | Red (improved) | x |
| Without a filter | — | Greenish white | Orangish red | — |

As is apparent from the above results, filters having no cracking and capable of correcting color balance of PDP can be obtained by the ratio of dye/binder of the filter layer falling within the range of from 1:50 to 1:2,000. Further, the same results can be obtained when the face of sample sticking is not only E face but F face and G face in FIG. 1.

INDUSTRIAL APPLICATION

The front panel according to the present invention can be applied to image displays such as a liquid crystal display (LCD), a plasma display panel (PDP), an electroluminescence display (ELD), and a cathode ray tube (CRT), in particular, when used as the front panels of a plasma display panel (PDP) and a cathode ray tube (CRT), conspicuous effect can be obtained.

The invention claimed is:

1. A plasma display panel comprising an optical filter comprising a transparent support having provided at least on one side of the support a filter layer containing a dye and a polymer binder, wherein the filter layer has an absorption maximum in the range of wavelength of from 500 to 620 nm, wherein an antireflection layer having an antireflection property to visible light is provided on the side opposite to the side on which the filter layer is provided when the filter layer is provided on either one side, and the antireflection layer is provided on either one side when the filter layers are provided on both sides, and said transparent support comprises a biaxially stretched film having a thickness of from 10 to 500 μm, wherein at least one side of said transparent support is provided with an undercoat layer comprising a polymer having a glass transition temperature of from −60° C. to 60° C., and wherein the undercoat layer provided on the transparent support comprises a first undercoat layer contiguous to the transparent support comprising a styrene-butadiene-based copolymer and a second undercoat layer comprising an acrylic-based resin.

2. The plasma display panel as claimed in claim 1, wherein the dye is selected from the group consisting of a squarylium-based compound, azomethine-based compound, cyanine-based compound, oxonol-based compound, anthraquinone-based compound, azo-based compound and benzylidene-based compound, and wherein said filter layer has an absorption maximum in the range of from 560 to 620 nm, and the weight ratio of said dye and said polymer binder is from 1:50 to 1:2,000.

3. The optical filter as claimed in claim 1, wherein the material of said biaxially stretched film is a polyester, a polycarbonate or a polyacrylate.

* * * * *